United States Patent [19]

Chang et al.

[11] Patent Number: 4,988,778
[45] Date of Patent: Jan. 29, 1991

[54] POLYAMINE-FUNCTIONAL SILANE RESIN

[75] Inventors: Wen-Hsuan Chang; J. Alden Erikson, both of Gibsonia, Pa.

[73] Assignee: PPG Industries, Inc., Pittsburgh, Pa.

[21] Appl. No.: 466,892

[22] Filed: Jan. 18, 1990

[51] Int. Cl.$^5$ .............................................. C08L 63/00
[52] U.S. Cl. ..................................... 525/476; 528/28; 528/29; 528/34; 528/38; 528/27; 528/26; 556/413; 556/425; 525/474; 525/479; 525/100
[58] Field of Search ....................... 528/28, 29, 34, 38, 528/27, 26; 556/413, 425; 525/474, 476, 479, 100

[56] References Cited

U.S. PATENT DOCUMENTS

| | | |
|---|---|---|
| 2,885,419 | 5/1959 | Beinfest et al. ................ 260/448.8 |
| 3,426,057 | 2/1969 | Kanner ............................ 260/448.2 |
| 3,895,043 | 7/1975 | Wagner et al. .............. 260/448.8 R |
| 4,031,120 | 6/1977 | Gervase ....................... 260/448.8 R |
| 4,093,673 | 6/1978 | Chang et al. ................. 260/824 EP |
| 4,243,767 | 1/1981 | Kaufman et al. .................. 525/102 |
| 4,678,835 | 7/1987 | Chang et al. ....................... 525/100 |
| 4,684,697 | 8/1987 | Chang et al. .......................... 528/28 |
| 4,754,012 | 6/1988 | Yoldas et al. ......................... 528/29 |
| 4,916,199 | 4/1990 | Bendlish et al. ..................... 528/29 |

Primary Examiner—Melvyn I. Marquis
Assistant Examiner—Karen A. Hellender
Attorney, Agent, or Firm—Godfried R. Akorli

[57] ABSTRACT

Disclosed herein are organosilane resins which are derived from an aminoalkoxysilane and hydroxy- and amine-functional compound; said resins are useful in curable compositions containing epoxy materials.

7 Claims, No Drawings

POLYAMINE-FUNCTIONAL SILANE RESIN

BACKGROUND OF THE INVENTION

1. Field of the Invention

The present invention relates to a silane resin. More specifically, the present invention relates to a silane resin containing a plurality of active amino groups for use in curing a resinous material.

2. Brief Description of the Prior Art

The use of a silane resin in a curable composition is generally known in the art. The prior art teaches that an alkoxysilane resin could rely principally on the moisture cure of an alkoxysilane group to effect cure. The prior art also teaches that a silane resin could rely on a silane-hydrolyzate to effect cure. Of interest here is a silane resin which can rely on other functional groups as well to effect cure.

It would, however, be realized that incorporation of a reactive functional group, in particular, an amine-functional group, into a resin, while desirable, can be difficult. The associated difficulty may be manifested by unwanted molecular weight increase and, consequently, viscosity increase of the resin due to unwanted side reactions such as branching or crosslinking. Illustratively, the reaction of a diamine with a diepoxide may result in a high viscosity product. An alternate approach of employing an amine compound containing another reactive group such as a hydroxyl group presents its problems. Since the amine, in many reactions, is more reactive than other functional groups, it is consumed in preference to the other functional groups. Thus, the desired amine-functional group is typically lost via reactions with esters, acids, isocyanates, epoxies and the like.

Moreover, many of the art-known aminosilane resins are typically characterized by a hydrolytically unstable silane bonding in the form of:

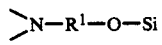

bonding wherein $R^1$ is a hydrocarbon radical. A requirement of this invention is that the aminosilane resins contain at least one amine nitrogen bonded to a Si atom via a hydrocarbon radical without an intervening oxygen atom adjacent to the Si atom. Such an aminosilane resin contains a hydrolytically more stable silane bonding in the form of:

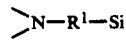

SUMMARY OF THE INVENTION

In accordance with the foregoing, the present invention encompasses a stable polyamine-functional silane resin which is prepared by reacting an aminoalkoxysilane with a hydroxy- and an amine-functional compound. By the term "polyamine" herein is meant two or more amino groups. In an illustrative embodiment of the invention, the polyamine-functional organosilane resin is prepared by reacting aminopropyltriethoxysilane with diisopropanolamine.

The above reaction product can be employed in combination with an epoxy resin to produce a low temperature curable coating composition which is stable and is preferably of high solids. When cured, the coating composition produces a flexible, hard and durable film. The coating composition and an article of matter prepared therewith are also encompassed by the claimed invention.

DETAILED DESCRIPTION OF THE INVENTION

The polyamine-functional organosilane resin of this invention is ungelled and is characterized by its high solids content, good working viscosity and cure properties that attend the curable coating composition and a film thereof.

The aminoalkoxysilane useful herein is of the formula:

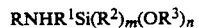

wherein R is hydrogen, hydrocarbon or substituted hydrocarbon radical such as an alkyl group with no more than four carbon atoms, an aminoalkyl group, akylaminoalkyl group or alkoxysilano alkyl group with no more than 6 carbon atoms in the alkyl group; $R^1$ is an alkylene having 1 to 6 carbon atoms; cycloalkylene or aryl group; $R^2$ is an alkyl having 1 to 10 carbon atoms, cycloalkyl or aryl group; $R^3$ is a lower alkyl group having about 1 to 4 carbon atoms; m is 0 or 1; n is 3 to 2; and $(m+n)=3$. The amine moiety is preferably a primary or secondary amine and the amine nitrogen content is about 1 to 20 and preferably about 3 to 14 percent by weight. The definition of $R^1$, $R^2$, and $R^3$ as described hereinabove can be broadened to encompass other hydrocarbon or substituted hydrocarbon radicals provided that the nature thereof is not such as would adversely affect the preparation or use of the claimed invention. Non-limiting examples of the aminoalkoxysilane can be aminoethyltrimethoxysilane, aminopropyltrimethoxysilane, aminopropyltriethoxysilane, aminopropylmethyldimethoxysilane, aminopropylmethyldiethoxysilane, aminoethyl-gamma-aminopropyl-trimethoxysilane, and iminobis(propyltrimethoxysilane).

The useful hydroxy- and amine-functional compounds can be an amino alcohol, a polyamino alcohol, a polyamino polyalcohol, or an amino polyalcohol which is preferred. Non-limiting examples of the hydroxy- and amine-functional compounds can be diisopropanolamine, diethanolamine, diisobutanolamine, ethanolamine, isopropanolamine, N-aminoethyl-ethanolamine or N-aminopropyl-diethanolamine. The useful hydroxy and amine-functional compounds may contain an amide, a urethane or urea substituent or moiety in the chain of the compound; with the proviso that the substituent or moiety does not adversely affect the preparation or use in accordance with this invention.

Yet, other hydroxyl- and amine-functional compounds useful herein can be prepared by appropriately modifying a hydroxy- and amine-functional compound or a precursor thereof as illustrated hereinafter. An amine-functional compound or a hydroxy- and amine-functional compound can be reacted with an epoxy compound such as a diepoxide, e.g., DRH 151 (a saturated epoxide from Shell Chemical Co., also known as EPONEX 1510) or a monoepoxide such as CARDURA E (a glycidyl ester of a 9,10-unsaturated Versatic acid from Shell Chemical Co.); a polyamino alcohol or a polyamine can be reacted with a carbonate, e.g., propylene carbonate; a lactone such as a caprolactone, or a butyrolactone; a polyamino alcohol can be reacted with an isocyanate, e.g., trimethylhexamethylene diisocyanate. Specifically, isopropylamine and CARDURA E can be reacted at 1:1 mole ratio; butylamine and phenyl glycidyl ether can be reacted in a mole ratio of 1:1; isophorone diamine and caprolactone can be reacted in a mole ratio of 1:1; a diisopropanolamine and hexamethylene diisocyanate can be reacted in greater than 2:1 mole ratio to produce the useful hydroxy- and amine-functional compound. In preparing the silane resin, the aminoalkoxysilane and the hydroxy- and amine-functional compound can be employed in a ratio of about 1:10 to 10:1 and typically about 3:1 to 1:1 equivalents based on the alkoxysilane and hydroxyl content of the hydroxy- and amine-functional compound.

The reaction conditions can be as follows. The reaction of the aminoalkoxysilane and the hydroxy- and amine-functional compound is conducted under conditions that result in an ungelled polyamine organosilane resin. Typically, the reaction is conducted over a temperature range of 80° C. to 230° C. and preferably 100° C. to 200° C. for about 0.5 to 20 hours and preferably from about 1 to 10 hours, typically the by-product alcohol is removed. When necessary, a solvent can be employed for ease of reaction. An example of the solvent can be xylene, toluene or the like. Also catalysts such as tin compounds, acids, bases, titanium compounds or the like can be employed.

The reaction product comprising the polyamine-functional silane resin is described as ungelled. By the term "ungelled" herein is meant that which will flow or will dissolve in a solvent such as methanol. Preferably, the polyamine-functional silane resin is of a high solids of about 60 to 100 percent and preferably from about 70 to 100 percent based on total resin solids, measurable at 110° C. over 30 minutes by ASTM Method 2369. The polyamine-functional silane resin can have a viscosity ranging from about 50 to 5000 and preferably from about 100 to 4000 centipoises measured at 25° C. with a Brookfield viscometer. The number average molecular weight of the polyamine-functional silane can be from about 150 to 5000 and preferably from about 170 to 2000 based on polystyrene standard measured by gel permeation chromatography. The amine or silane equivalent weight can be less than 1000 and preferably less than 500. The resultant polyamine-functional silane resin is stable in that it is storage stable and remains ungelled for a period of at least one month in an air-tight container by which the introduction of moisture therein is prevented.

In the practice of the invention, the polyamine-functional silane resin can be employed in a curable coating composition. It is envisaged that the curable composition of this invention will be formulated as a multi-pack, e.g., a two-pack composition wherein the polyamine-functional silane is in one pack and a material containing a curable group is contained in the other pack. An illustrative but non limiting example of such a material can be an epoxy material, e.g., a polyepoxide such as a polyglycidyl ether or an ester of a polyol. Specific examples thereof can be a diglycidyl ether bisphenol A, e.g. EPON 1001, a non-aromatic epoxy resin such as EPONEX 1510 epoxy resin (available from Shell Chemical Co.); epoxy-containing novolac resins; epoxy containing acrylic polymers. Other curable materials useful herein can be isocyanates (including blocked isocyanates) such as isophorone diisocyanate, toluene diisocyanate, DESMODUR N-100 polyisocyanate (available from Mobay Corp.), or tetramethylxylylene diisocyanate; materials containing acrylic groups, such as pentaerythritol triacrylate, or materials which contain a mixture of the groups such as the epoxy and acrylate group, e.g., glycidyl acrylate.

The curable composition can be prepared by blending the polyamine-functional silane resin with the curable material. A solvent and a catalyst can be employed in the curable composition. The useful solvent can be xylene, alcohols, such as methanol or ethanol; toluene, butyl cellosolve or the like. The catalyst can be a tin compound such as dibutyltin dilaurate; calcium nitrate and the like. An additive such as such as an antioxidant, an ultra-violet light absorber, a pigment or the like or a mixture thereof can be employed herein.

The polyamine-functional silane resin is employed in an amount sufficient to effect cure of the coating composition. Typically, the polyamine-functional silane resin is employed in an amount of about 5 to 90 percent and preferably from about 10 to 80 percent by weight based on total resin solids.

Curable coating compositions of this invention are of a low volatile organic content (VOC) of about 0.1 to 6 pounds per gallon and preferably from about 0.2 to 4 pounds per gallon. VOC is defined as weight per volume of any organic compound that evaporates from the curable composition. VOC can be determined by ASTM D3690 testing.

The coating composition can be applied to the surface of a substrate such as metal, wood, plastic, hardboard or the like as a protective and/or decorative coating. Any convenient application means can be employed. Spray application is preferred herein. A substrate such as a metal, plastic, paper, wood or the like can be coated herewith.

The applied coating can be cured at room temperature over 5 hours to 3 days or it can be heated to an elevated temperature sufficient to effect cure. Typically, the applied coating is heated at about 80° F. to 350° F. and preferably from about 120° F. to 250° F. for about 5 to 60 minutes and preferably from about 10 to 30 minutes.

The cured coating has very desirable film properties. The following examples further illustrate the invention.

EXAMPLE 1

To a 3-liter 4N round-bottomed flask equipped with a mechanical stirrer, nitrogen purge at 0.2 standard cubic feet per hour, a 12-inch Vigreaux distillation column and condensor/receiver were charged 980 g of diisopropanolamine and 1320 g of gamma-aminopropyltrimethoxysilane. The flask was heated over five hours to a maximum temperature of 180° C. while 530 milliliters of distillate was collected. The reaction product was a clear liquid with viscosity (Gardner Holdt) of M+, and 8.1 milliequivalents of amine per gram. The product had a color (Gardner) of 1 and density of 8.83 pounds per gallon.

The reaction product was tested for film-forming properties shown below: 12.3 g of the reaction product was combined with 23.8 g of EPONEX 1510 (hydrogenated bisphenol type epoxy resin, a product of Shell Chemical Co.), 2 g of xylene, and 2 g of butyl CELLOSOLVE and stirred to produce a homogeneous solution. A drawdown was made on a BONDERITE® 1000 pretreated steel panel (available from Parker Co.) with a 0.006 inch Bird applicator; ten minutes were allowed for solvent evaporation. The resulting film was baked at 250° F. for 30 minutes and yielded a hard film with low gloss.

EXAMPLE 2

In a manner similar to that of Example 1, 493 g of diisopropanolaine and 707 g of gamma-aminopropyl-dimethoxymethylsilane were combined and heated. After 14 hours, at a maximum reactor temperature of 220° C., there was obtained a reaction product (903 g) with amine equivalent weight of 112.

The above product (11.2 g) was blended with 23.8 g of EPONEX 1510. To 13.9 g of the resultant blend was added 0.42 g of nonyl phenol and the resulting mixture was stirred until it became homogeneous. The blend without nonyl phenol and the blend with nonyl phenol were drawn down into films in essentially the same manner as described in Example 1, and cured with the following reported results in the table below.

TABLE 1

| Film | Curing Schedule | Catalyst (Nonyl Phenol) | Pencil Hardness | Appearance | Impact Test (Inch Pounds) | |
|---|---|---|---|---|---|---|
| | | | | | Forward | Reverse |
| 1. | Room temperature/overnight | No | 4B | Orange peel | — | — |
| 2. | Room temperature/overnight | Yes | 4B | Orange peel | — | — |
| 3. | 180° F./30 minutes | Yes | H | Good gloss | >160 | 120-140 |
| 4. | 180° F./30 minutes | No | H | Good gloss | >160 | >160 |

This demonstrates that excellent, high solids, hard, impact-resistant coatings with good properties can be prepared from the aminosilane resins when cured with epoxy resins in accordance with the present invention.

EXAMPLE 3

To a 1-liter 4N round-bottomed flask equipped with a mechanical stirrer, nitrogen purge at 0.2 standard cubic feet per hour, a 12-inch Vigereaux distillation column and condensor/receiver were charged 133 g (1 mole) of diisopropanolamine, 179 g (1 mole) of gamma-aminopropyltrimethoxysilane and 2 grams of dibutyltin dilaurate. The flask was heated over five hours to a maximum temperature of 182° C. while 64.6 milliliters of distillate was removed.

8.1 grams of the resultant product and 23.8 g of EPONEX 1510 (epoxy resin) and 1.0 g of dibutyltin dilaurate were mixed with stirring. A clear drawdown of the resultant mixture was made with an 0.003 inch Bird applicator, and baked at 121° C. for 30 minutes. The resultant film passed a 40 inch-pound direct impact test and was moderate in its marring with a steel wool rub test.

In an evaluation similar to the above, the EPONEX 1510 (epoxy resin) level was reduced to 19.0 g. This coating passed a 60 inch-pound direct impact test and exhibited a better mar resistance than the coating with a higher level of EPONEX.

EXAMPLE 4

Into a properly equipped reaction vessel were charged Cardura E (250 g, 1 mole), propanolamine (75 g, 1 mole) and gamma-aminoproplytrimethoxysilane (179 g, 1 mole), mixed and heated slowly with stirrer under a nitrogen blanket for four hours from 25° C. to 163° C. There was 61.3 g weight loss.

A coating composition of the resultant product was as follows: 11.2 g of the product was mixed with 11.9 g of DRH 1510 epoxy resin. The coating was drawn down on a steel substrate (BONDERITE ® 1000) and cured at 250° F. for 30 minutes to produce coatings of good film.

EXAMPLE 5

Into a properly equipped reaction vessel were charged Cardura E (250 g, 1 mole) and isopropanolamine (75 g, 1 mole). The resulting reaction was exothermic. With water bath cooling, the reaction temperature rose to 142° C. The reaction was conducted for five hours and at 60°. Thereafter, aminopropyltrimethoxysilane (199 g, 1 mole) was added to the reaction mixture which was heated over 2 hours to 152° C., with 50.3 g of methanol being removed.

EXAMPLE 6

Into a properly equipped reaction vessel was charged isopropanolamine (150 g, 2 moles) and heated to 90° F. Over a temperature range of 90° F. to 120° F. and a period of 2 hours, a mixture of Cardura E (300 g, 1.2 mole) and DRH 151 (188 g, 0.47 mole) was slowly added to the reaction vessel. Three hundred nineteen (319) grams of the resultant product was added to aminopropyltrimethoxysilane (179 g, 1 mole) and heated to 152° F. over two hours, with 48.1 g of distillate being removed. The resultant product had an amine equivalent weight of 311 5.

EXAMPLE 7

In a properly equipped reaction vessel, diisopropanolamine (133 g, 1 mole) was mixed with a 2:1 mole ratio trimethylhexamethylene diisocyanate and 1,6-hexanediol isocyanate prepolymer (133 g, 0.23 mole). The reaction temperature went to 90° C. The product had both amine and hydroxy groups. After cooling to 70° C., there was added aminopropyltrimethoxysilane (179 grams, 1 mole). The reaction mixture was heated slowly to 156° C. Weight loss was 47 g. The product had amine equivalent weight of 270.

Thirteen and one-half (13.5) grams of above was mixed with 5 g of xylene, 3 g of methanol and 12.0 and 14.0 g of EPONEX 1510, respectively. The resultant products were drawn down with 0.003 Bird applicator on BONDERITE ® 1000 and cured at 250° F. for 30 minutes. The resultant cured films passed a 160 inch-pound direct impact test, and a 40 inch-pound reverse impact test, and exhibited a pencil hardness of 3H. Resin pot life was three hours.

While the illustrative embodiments of the invention have been described hereinabove, it will be understood that various modifications will be apparent to and can be made by those skilled in the art without departing from the scope or spirit of the invention. Accordingly, it is intended that the claims directed to the invention be construed as encompassing all aspects of the invention which would be treated as equivalents by those skilled in the art to which the invention pertains.

What is claimed is:

1. A stable polyamine-functional silane resin which is prepared by reacting:
   (i) an aminoalkoxysilane and
   (ii) a hydroxy- and amine-functional compound.

2. The silane resin of claim 1 wherein the aminoalkoxysilane is of the formula:

$$RNHR^1Si(R^2)_m(OR^3)_n$$

wherein R is hydrogen, an alkyl group with no more than four carbon atoms, an aminoalkyl group, alkylaminoalkyl group or alkoxysilano alkyl group with no more than 6 carbon atoms in the alkyl group; $R^1$ is an alkylene having 1 to 6 carbon atoms, cycloalkylene or aryl group; $R^2$ is an alkyl having 1 to 10 carbon atoms, cycloalkyl or aryl group; $R^3$ is an lower alkyl group having 1 to about 4 carbon atoms; m is 0 or 1; n is 3 to 2; and m+n=3.

3. The silane resin of claim 2 wherein the aminoalkoxysilane is aminoethyltrimethoxysilane, aminopropyltrimethoxysilane, aminopropyltriethoxysilane, aminopropyldimethoxymethylsilane, aminopropyldiethoxymethylsilane, aminoethyl-gamma-aminopropyltrimethoxysilane, or iminobis(propyltrimethoxysilane).

4. The silane resin of claim 1 wherein the hydroxy and amine functional compound is an amino alcohol, amino polyalcohol, a polyamino alcohol or a polyamino polyalcohol.

5. The silane resin of claim 4 wherein the hydroxy and amino-functional compound is a polyhydroxy amine.

6. The silane resin of claim 4 wherein the hydroxy and amine-functional compound is diisopropanolamine, diethanolamine, diisobutanolamine, ethanolamine, isopropanolamine, N-aminoethyl-ethanolamine or N-aminopropyl-diethanolamine.

7. A curable composition comprising:
   (i) the reaction product of claim 1 and
   (ii) a curable material containing a functional group which is an epoxy group, an acrylic group, an isocyanate group or a mixture thereof.

* * * * *